United States Patent
Child et al.

(10) Patent No.: US 10,505,980 B2
(45) Date of Patent: Dec. 10, 2019

(54) SECURED USER CREDENTIAL MANAGEMENT

(71) Applicant: Okta, Inc., San Francisco, CA (US)

(72) Inventors: Reman P. Child, Emeryville, CA (US); Hector Aguilar-Macias, Palo Alto, CA (US)

(73) Assignee: Okta, Inc., San Francisco, CA (US)

( * ) Notice: Subject to any disclaimer, the term of this patent is extended or adjusted under 35 U.S.C. 154(b) by 0 days.

(21) Appl. No.: 15/257,850

(22) Filed: Sep. 6, 2016

(65) Prior Publication Data

US 2017/0078326 A1 Mar. 16, 2017

Related U.S. Application Data

(60) Provisional application No. 62/217,234, filed on Sep. 11, 2015.

(51) Int. Cl.
*H04L 29/06* (2006.01)

(52) U.S. Cl.
CPC .......... *H04L 63/1483* (2013.01); *H04L 63/08* (2013.01); *G06F 2221/2119* (2013.01)

(58) Field of Classification Search
CPC .............................. H04L 63/1483; H04L 63/08
See application file for complete search history.

(56) References Cited

U.S. PATENT DOCUMENTS

| | | | |
|---|---|---|---|
| 8,555,384 B1 * | 10/2013 | Hanson | H04L 63/1408 380/255 |
| 9,408,182 B1 * | 8/2016 | Hurley | H04L 67/20 |
| 2005/0187895 A1 * | 8/2005 | Paya | G06F 21/41 |
| 2006/0123464 A1 * | 6/2006 | Goodman | H04L 63/1416 726/2 |
| 2006/0123478 A1 | 6/2006 | Rehfuss et al. | |
| 2006/0253446 A1 | 11/2006 | Leong et al. | |
| 2007/0039038 A1 * | 2/2007 | Goodman | H04L 63/1408 726/2 |
| 2007/0199054 A1 * | 8/2007 | Florencio | H04L 63/1416 726/5 |
| 2008/0028444 A1 | 1/2008 | Loesch et al. | |

(Continued)

FOREIGN PATENT DOCUMENTS

WO WO 2015/000422 A1 1/2015

OTHER PUBLICATIONS

Huajun Huang et al., "Browser-side Countermeasure for Deceptive Phishing attack," 2009 IEEE, pp. 352-355. (Year: 2009).*

(Continued)

*Primary Examiner* — Luu T Pham
*Assistant Examiner* — Canh Le
(74) *Attorney, Agent, or Firm* — Fenwick & West LLP

(57) ABSTRACT

An identity management system prevents users' credential information from being harvested by phishing attackers. The identity management system can installed as a plug in on users' devices. Destinations that solicit users' credential information are verified. For example, web addresses or registered names of websites that receive users' credential information can be verified against known web addresses or registered names to verify their authenticity. When verification of the authenticity of a destination fails, a user is alerted and submission of credential information needs to be confirmed.

17 Claims, 3 Drawing Sheets

(56) References Cited

U.S. PATENT DOCUMENTS

| | | | |
|---|---|---|---|
| 2008/0141342 A1* | 6/2008 | Curnyn | H04L 63/0227 726/3 |
| 2009/0228780 A1* | 9/2009 | McGeehan | G06F 21/55 715/234 |
| 2010/0083383 A1* | 4/2010 | Adler | G06F 21/54 726/26 |
| 2011/0126289 A1* | 5/2011 | Yue | G06F 21/554 726/26 |
| 2013/0031627 A1 | 1/2013 | Wang et al. | |
| 2014/0137254 A1* | 5/2014 | Ou | H04L 63/145 726/24 |

OTHER PUBLICATIONS

Mohamad Badra et al., "Phishing Attacks and Solution," Mobimedia Mar. 8, 2007, pp. 1-6 (Year: 2007).*
PCT International Search Report and Written Opinion for PCT/US2016/050449, dated Dec. 14, 2016, 13 Pages.
Extended European Search Report, European Application No. 16844940.3, dated Feb. 14, 2019, 7 pages.

* cited by examiner

SECURED USER CREDENTIAL MANAGEMENT

CROSS REFERENCE TO RELATED APPLICATION

This application claims the benefit of U.S. Provisional Application No. 62/217,234, entitled "Secured User Credential Management," filed on Sep. 11, 2015. The subject matter of the foregoing is incorporated herein by reference in its entirety.

FIELD OF THE INVENTION

This application generally relates to the field of computer security and, in particular, to preventing harvesting of user credentials from web-based applications.

DESCRIPTION OF THE RELATED ART

Phishing is a type of security threat where attackers harvest sensitive information from victims by using fake websites. The websites used by attackers use domain names that are very similar to those of the target websites so that victims believe they are submitting information to genuine websites. For example, the website https://neighborhood-bank.ru could be used to deceive users into believing they are submitting information to a (hypothetical) bank named Neighborhood Bank due to its similarity to the legitimate website URL, https://neighborhoodbank.com.

In conventional systems, users bear the burden of being vigilant against these types of attacks. For example, a user needs to verify that the domain is correct and the SSL certificate is valid when he or she visits a website in order to ensure that the website is legitimate. In addition, attackers can compromise (for example) email or instant messaging accounts known to users and send links from those accounts, such that users are more likely to click on the links due to their familiarity with the accounts. For example, a user's "friend" (actually an attacker impersonating the friend via the friend's account) could send him or her an email containing a link requesting the user to reset the user's bank account credentials. The user clicks on the link and is taken to a page that has a similar domain name and appears to be the user's bank, but that actually is under the control of the attacker. The user then enters his or her bank credentials, which are successfully obtained by the attacker.

SUMMARY

The above and other issues are addressed by a computer-implemented method and computer system for providing secured identity management services. In one embodiment, a method of providing secured identity management services comprises receiving, from a user, a request to visit a website having an input form with credential fields for receiving user credential information. The method determines whether the website is authentic by comparing a web address associated with the destination to a list of known authentic web addresses. Responsive to determining that the destination is not authentic: the method hooks a form submission event of the webpage with scripting code. The method overlays the credential fields with a substitute form, such that user credential information associated with the input form is stored in the substitute form rather than the input form. In response to a user attempting to submit the input form, the scripting code confirms with the user whether to provide the credential information to the website. Responsive to the user confirming, the scripting code causes the user credential information to be submitted.

In one embodiment, a method of providing secured identity management services includes receiving, from a user, a request to visit a website. The website include one or more webpages. The method determines whether the website is authentic. In response to determining that the website is authentic, and in response to a user's request to submit credential information to the website, the method submits the credential information to the website. In response to determining that the website is unauthentic, in response to a user's request to submit the credential information to the website, the method confirms with the user whether or not the credential information should be provided to the website.

In one embodiment, a computer system of providing secured identity management services include a non-transitory computer-readable storage medium storing computer program modules executable to perform steps comprising receiving, from a user, a request to visit a website. The website includes one or more webpages. The computer program modules executable to perform determining whether the website is authentic. The computer program modules executable to perform in response to determining that the website is authentic, and in response to a user's request to submit credential information to the website, submitting the credential information to the web site. The computer program modules executable to perform in response to determining that the website is unauthentic, in response to a user's request to submit the credential information to the website, confirming with the user whether or not the credential information should be provided to the website.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION

The figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
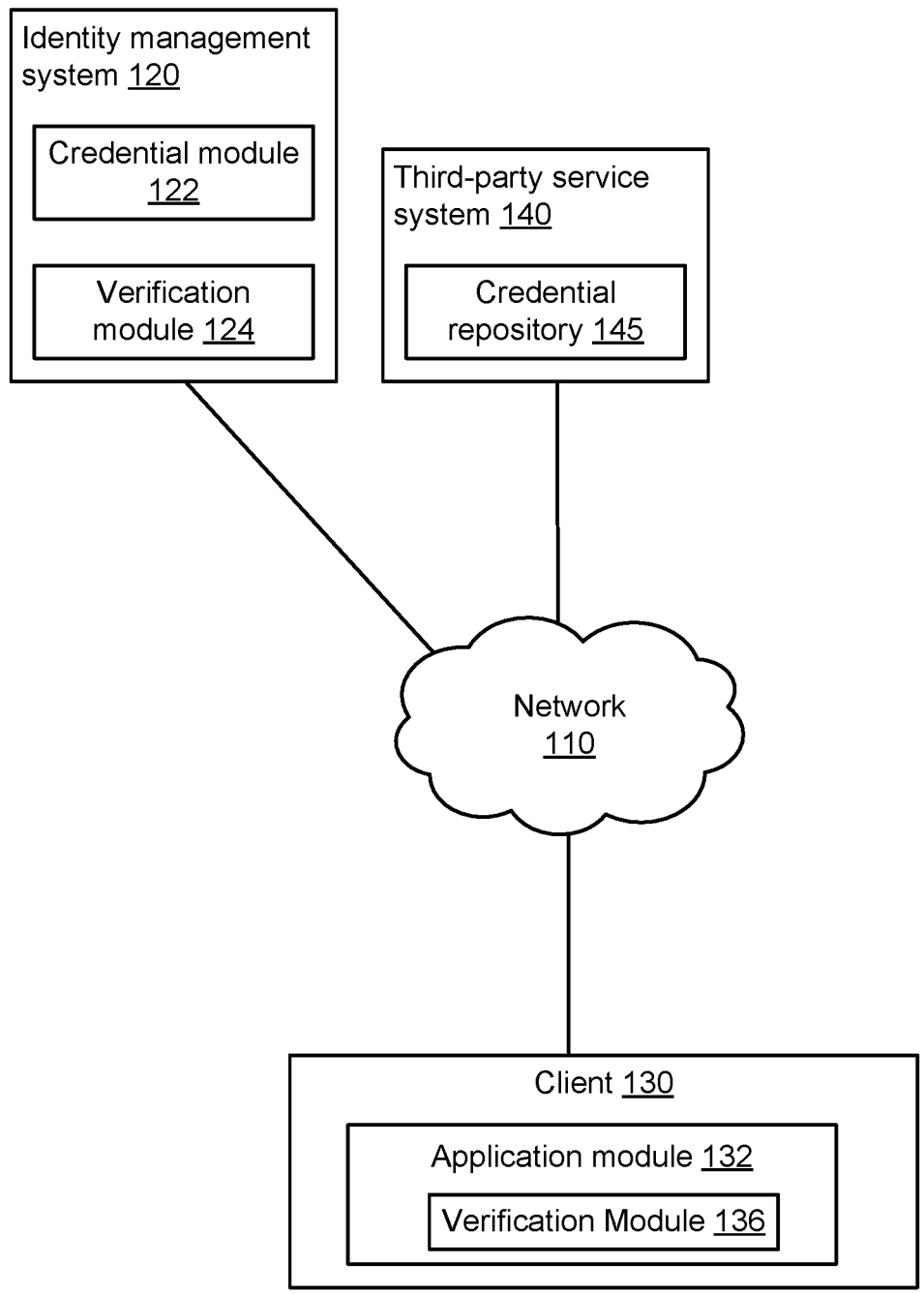
FIG. 1 is a high-level block diagram illustrating an environment for managing users' credentials in a secured manner, according to one embodiment.

FIG. 1 is a high-level block diagram illustrating an environment 100 for managing users' credentials in a secured manner, according to one embodiment. The environment 100 may be in part maintained by an enterprise (e.g., an identity management service) that provides a user credential service that manages users' credentials for use with third-party service user accounts, identifies malicious websites, and prevents the users' credentials from being submitted to those identified malicious websites. For example, an identity management system 120 manages credentials (e.g., user name and password) for the users at a third-party service system 140 and verifies the authenticity of websites. After confirming that a website is legitimate, the identity management system 120 interacts with the third-party service system 140 so that a user can access his or her user account. After detecting that a website is malicious, the identity management system 120 alerts or prevents the user from submitting the user's credentials to the malicious website. In various embodiments, a user may install a plugin for the identity management system 120 on the client 130.

As described herein, a website includes one or more webpages that may be linked together. A webpage is a document presented to a user to present information. A website can be accessed by a web address (e.g., a uniform resource locator (URL)). The web address can be used to determine a registered name (e.g., a host name, a domain name) or an IP address of the resource (e.g., computer, service, network) hosting the website. A webpage may include one or more input fields (e.g., a form) that solicits users for credential information for submission to a destination web address. As described herein, "credential information" refers to information that is confidential and private to users. Credential information can be used to verify users' identities. Example credential information includes user names, account names, license numbers, credit card numbers, passwords, biometrics, and the like.

As shown, the environment 100 includes a network 110, an identity management system 120, a client 130, a third-party service system 140, and a device management system 150. While one identity management system 120, one client 130, one third-party service system 140, and one device management system 150 are shown in the embodiment depicted in FIG. 1 for clarity, other embodiments can have different numbers of identity management systems, clients, third-party service systems, and device management systems.

The network 110 represents the communication pathway between the identity management system 120, the client 130, the third-party service system 140, and the device management system 150. In one embodiment, the network 110 uses standard wireless and wired communications technologies and protocols and can include the Internet and associated protocols. In another embodiment, the entities on the network 110 can use custom and/or dedicated data communications technologies.

A client 130 is a computer (or set of computers) that enables a user to access various third-party services. The client 130 can be, for example, a desktop computer, a laptop computer, a tablet computer, or a smart phone. The client 130 includes one or more application modules 132. A particular application module 132 enables the client 130 to access third-party services provided by a particular third-party service system 140. For example, an application module 132 interacts with a third-party service system 140 to log in to a user account of the third-party service system by using corresponding credential information (e.g., using a username/password combination). After logging in, the application module 132 interacts with the third-party service system 140 to access various services.

In one embodiment, the application module 132 is a native application that executes on an operating system of the client 130, such as a web browser. In another embodiment, the application module 132 is a plugin for a web browser of the client 130. In yet another embodiment, the application module 132 is a link to a website provided by the third-party service system 140. In some embodiments in which the application module 132 is a web browser, the application module includes a verification module 136, which is a browser plugin that monitors user interactions with websites and modifies the typical user interactions with the websites in order to prevent user credentials from being phished. In some embodiments, the verification module 136 monitors user interactions with websites and transmits the observed information to the verification module 124 which modifies or instructs the verification module 136 to modify the user interactions with the websites to prevent user credentials from being phished.

The identity management system 120 is a computer (or set of computers) that provides secured identity management services. Identity management services include, for example, managing user accounts at various third-party services. For example, the identity management system 120 configures accounts of users on third-party service systems 140, e.g., setting and tracking the user login credentials such as username and password, using the login credentials to perform single sign-on for the users onto all their user services, and the like. In some embodiments, the identity management system 120 additionally interacts with the verification module 136 on the client device 130 to prevent theft of user credentials by attackers such as malicious websites.

The identity management system 120 includes a credential module 122 and a verification module 124. The credential module 122 stores, for each of the users that use the anti-phishing system, a list of the third-party services 140 that the user uses (e.g., the web addresses of the services), as well as the user's credentials (e.g., username and password) for those services. The credentials may be stored encrypted or unencrypted. If encrypted, the encrypted credential need not be decrypted unless and until the credentials need to be provided for login purposes. If the credential is stored encrypted with a user-level key, then the credential can be decrypted by only the client 130 that has access to the user-level key.

The credential module 122 also interacts with third-party services to provide credentials associated with the user accounts on the third-party services 140 responsive to verifying the authenticity of the websites. For example, the credential module 122 interacts with a third-party service system 140 to provide a password for a user account so that the user can log into the user account. In one embodiment, the credential module 122 interacts with the third-party service system 140 via an application programming interface (API) provided by the third-party service system. In another embodiment, the credential module 122 interacts with the third-party service system 140 via a configurable web script that includes information regarding how to access the third-party service system. In one embodiment, the script conforms to the Extensible Markup Language (XML) standard. In another embodiment, a particular script is stored in association with a reference to a particular third-party service system 140. In yet another embodiment, the script is generated automatically.

When users request to submit credentials to the third-party service 140, the verification module 136 verifies the authenticity of destinations (e.g., websites) prior to releasing the credentials to the destinations. For example, in response to a triggering event such as a user attempting to log into the third-party service system 140, the verification module 136 verifies the authenticity of the destination such as a web address of a website to receive the user's credentials. In another embodiment, rather than performing the verification itself, the application module 132 delegates to the verification module 124 on the identity management system 120 to verify the authenticity of the destination in response to a triggering event such as a user requesting access to a website. The verification module 136 may confirm whether a destination website requested to visit by a user is a known website. A website is considered to be a known website if the website's associated web address is known. A website is considered authentic if the associated web address (e.g., URL) belongs to a list of web addresses known to be legitimate; similarly, a website is considered unauthentic if the associated web address belongs to a list of web addresses known to be non-legitimate. For example, publicly known websites or websites where the user has established user accounts are known authentic websites. A website can also be considered authentic if the registered name or the IP address of the resource hosting the website belongs to a list of registered names or IP addresses known to be legitimate. Users are allowed to submit their credentials to the websites for which the authenticity has been confirmed. In some embodiments, a website can be considered unauthentic if the web address is unknown or cannot be verified. A website can also be considered unauthentic if the registered domain name or IP address hosting the website is unknown or cannot be verified.

In addition, a website may be considered unauthentic when it includes input fields to collect information for unauthentic destinations. For example, an input field hosted by unknown web addresses to receive the credential information entered in the input fields is considered unauthentic. The verification module 136 may use the credential information created and stored by the credential module 122, such as the user's credential information for the third-party services 140 that the user uses, to verify the authenticity of the destination to receive the credential information. The verification module 136 may determine a list of services based on the credential information entered by a user and verify the authenticity of the website by determining whether the website is included in the list of services. The verification module 136 may also verify the authenticity of the website using the destination to receive the user's credential information. The verification module 136 confirms that the destination is authentic when the input fields are hosted by known web addresses. A destination can also be considered authentic if registered names or IP addresses of the resources are known. The verification module 136 monitors all input fields present on a destination website and compares the credential entered by the user to the web addresses (registered names or IP addresses) associated with the credential entered by the user. When the web address (registered name or IP address) hosting the input form requesting input from the user matches the web address (registered name or IP address) associated with the credential entered by the user, the request for a user's credential is determined to originate from an authentic web address (registered name or IP address). Conversely, the request for a user's credential may originate from a potentially malicious web address (registered name or IP address) (e.g., where the website is considered unauthentic), and the verification module 136 alerts the user accordingly.

In some embodiments, the verification module 136 analyzes an unknown web address (or registered name) to verify its authenticity. If an unknown web address (or registered name) is determined to be similar (e.g., based on lexical similarity, such as that measured by the Levenshtein distance) to a known web address (or registered name), the verification module determines the unknown web address (or registered name) to be unauthentic and potentially malicious. For example, if a website with a log-in form hosted by the web address "https://bankofamerica.ru", the verification module 136 determines that this web address is roughly similar to "https://bankofamerica.com" and may be malicious.

In addition, the verification module 124 or 136 may maintain and use a list of web addresses (registered names and/or IP addresses) to verify the authenticity of the destination websites. In some embodiments, the verification module 124 maintains a list of malicious web addresses (registered names and/or IP addresses), which may be distributed to the verification module 136. Newly identified malicious web addresses (registered names and/or IP addresses) are included to the list of malicious web addresses (registered names and/or IP addresses). The verification module 136 may also submit any malicious web address (registered name and/or IP address) it discovers to the verification module 124 at a predetermined time or in real time.

Subsequently, the verification module 136 prevents users from submitting their credential information to unauthentic web addresses (registered names and/or IP addresses). In one embodiment, the identity management system 120 (e.g., the verification module 136 or the verification module 124) alerts a user that the web address (registered name and/or IP address) to which he or she is trying to submit credential information may be malicious. The identity management system 120 confirms with the user prior to releasing the credential information to potentially malicious websites in order to prevent the credential information from being compromised. For example, in some embodiments the identity management system 120 (e.g., the verification module 136 or the verification module 124) prevents submission of forms that include users' credential information, at least until warning the user and receiving using confirmation of submission. For example, in one embodiment, the verification module 136 hooks the form submission event by adding or modifying JavaScript or other scripting code of the webpage that responds to the form submission event. Then, when a user attempts to submit his or her credential information (e.g., by clicking a page element causing form submission to the web server, such as a "Login" button), the identity management system 120 intercepts the form submission event by performing checks and/or alerting the user to a possible phishing attempt. As one example, when a user enters his or her credential information into a form hosted by a malicious or potentially malicious web address (registered name and/or IP address) and submits the forms, the verification module 136 may alert the user that the web address is malicious and confirms with the user that he or she authorizes such submission. If a user authorizes the form submission despite the warning, the verification module 136 allows the application module 132 to submit the form including the user's credential information. If a user declines to allow the submission in response to the warning, the verification module 136 cancels the submission of the form. As such, the risk of an attacker obtaining the users' credential information for various third-party services is reduced.

Some attackers may obtain users' credential information in real time when it is being entered, via scripting code (e.g., JavaScript) that observes characters as they are input into forms, rather than waiting until final form submission. To thwart this form of real-time input observation, in one embodiment, in response to determining that a webpage with an input form is malicious, the identity management system 120 verification module 136 overlays a substitute form (e.g., a transparent iframe) on top of the input form hosted by the malicious web addresses (registered names and/or IP addresses), such that the substitute form, rather than the original form, receives user keystrokes or other input that the user destines for the original input form. The substitute form mimics the form hosted by the malicious web addresses (registered names and/or IP addresses) by having the same visual appearance. For example, the substitute form includes hidden input fields that mirror the input fields hosted by the malicious web addresses (domain names and/or IP addresses). As such, before the user authorizes submission of his or her credential information, the information entered by the user (into the substitute form) is not revealed to the underlying page hosted by the malicious web addresses (domain names and/or IP addresses), since the malicious scripting code monitors the original form fields, not the form fields of the added substitute form, into which the user information goes. If the user ultimately submits the form (e.g., after approving submission in response to a warning by the verification module 136 as described above), in some embodiments the verification module 136 inserts the credential information entered into the substitute form into the original form and causes submission of the original form, including the user's entered credential information.

The third-party service system 140 is a computer (or set of computers) that provides various third-party services. A third-party service is, for example, a cloud-based application service, a web-based application service, a network-based application service, an on-premises application, an enterprise application, a consumer application, or a custom-built internal application. The third-party service system 140 maintains user accounts that are logged into in order to access the third-party services. Credential information such as authentication information for these user accounts (e.g., username/password combinations) is stored in a credential repository 145 of the third-party service system 140. The third-party service system 140 provides an API that can be used by external systems to interact with the third-party service system. For example, the identity management system 120 can use a third-party service system API to log in to a user account of the third-party service system 140. As another example, the identity management system 120 can prevent the client 130 from submitting a user's credential information to a third-party service system API such that the third-party service system 140 cannot receive the user's credential information. A third-party service system 140 may be a phishing website that harvests users' credential information.

Verifying authenticity of destinations that receive users' credential information prevents users' privacy, security, and identity information from being harvested by attackers. The processes and systems described herein provide an effective solution to prevent phishing attacks.

Figure 2:
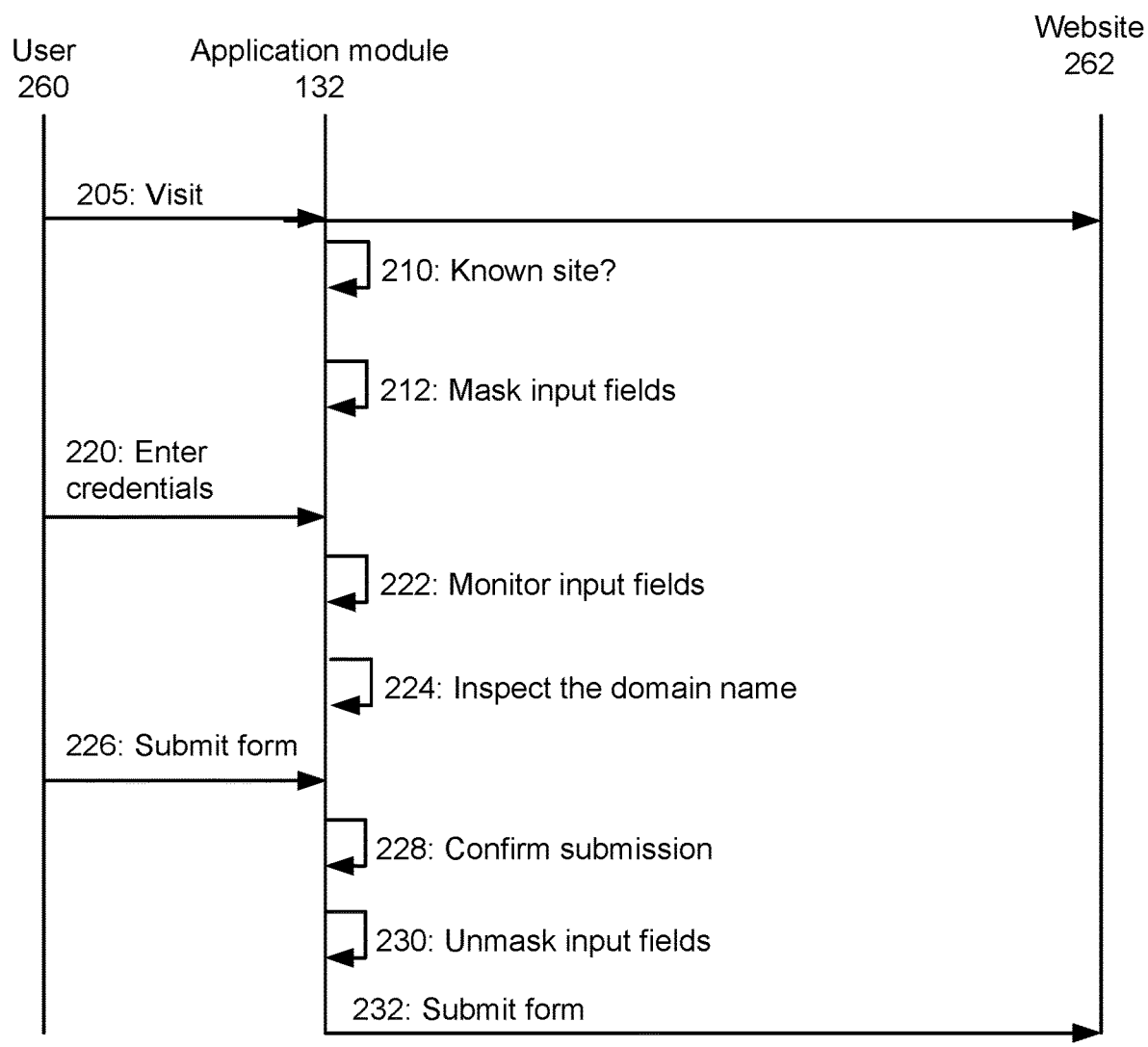
FIG. 2 illustrates interactions between a user, an application module, and a (possibly malicious) website, according to one embodiment.

FIG. 2 illustrates interactions between a user, the application module 132 of FIG. 1, and a (possibly malicious) website 262, according to one embodiment. A user requests 205 to visit a website 262 by specifying the web address of the website, for example, clicking a link to a URL of the website. In some embodiments, the application module 132 verifies whether the web address of the website is authentic. The application module 132 may additionally or alternatively verify whether a registered name or IP address of a resource hosting the website is authentic. The application module 132 determines 210 whether the web address of the website belongs to a list of known web addresses. For example, the credential module 122 maintains a list of known web addresses where a user has an account and the application module 132 inspects whether the web address of the web site is that list. Registered names and IP addresses can also be verified in a similar manner. In one embodiment, the application module 132 checks whether a domain name belongs to a list of known malicious domain names and warns the user about it. In one embodiment, the application module 132 inspects whether an unknown web address (or registered name) mimics a known web address (or registered name) and determines the web address (or registered name) to be potentially malicious when it mimics a known web address (or domain registered name).

In some cases, the application module 132 masks 212 the input fields by overlaying a transparent iframe or other substitute forms on top of a credential input form hosted by the website 262. The credential input form requests credential information from the user. As such, real-time observation of credential information is prevented because the user's credential information are entered into the transparent iframe provided by the application module 132. The application module 132 may mask the input fields using this transparent iframe responsive to determining the website 262 is unknown. In addition, the application module 132 may override the form submission sequence. For example, the application module 132 may add scripting code to the page that responds to a user's submission of the form. In response to a form submission request, a warning is provided to the user to confirm that the form should be submitted.

The user 220 enters his or her credential information. The application module 132 monitors 222 the credential information entered. In some embodiments, when the user is entering his or her credential information, the application module 132 warns the user responsive to determining the website has an unknown web address (domain name or IP address) at block 210. In some embodiments, the application module 132 identifies a set of web addresses (domain names and/IP addresses) associated with the credential information entered by the user 260. The application module 132 inspects 224 the web address (domain name or IP address) hosting the input form requesting credential information from the user. Responsive to determining that the web address (domain name or IP address) is not included in the set of web addresses (domain names or IP addresses) associated with the credential information entered by the user, the application module 132 may warn the user that the credential information is being entered into an unknown website.

The user 260 requests 226 to submit the form. The application module 132 submits 232 the form to the website 262 if the website 262 is authentic. Responsive to determining that the website 262 is unknown or potentially malicious, the application module 132 confirms 228 with the user on the submission. The application module 228 may warn the user that the credential information will be submitted to unknown websites, for example, when the web address (domain name or IP address) is determined as unknown at block 210 or when the web address (domain name or IP address) hosting the input form is determined as unknown at block 224. The application module 228 may warn the user that the credential information may be submitted to a potentially malicious website when the domain name is determined to belong to a list of potentially malicious web addresses (domain names or IP addresses) or determined to mimic a known authentic web address (or domain name). If an iframe is over-layed on the input form, the application module 132 unmask 230 the input fields by transferring the credential information entered by the user into the input form hosted by the website 262. The application module 132 submits the input form to the website 262 when the user confirms the submission.

Figure 3:
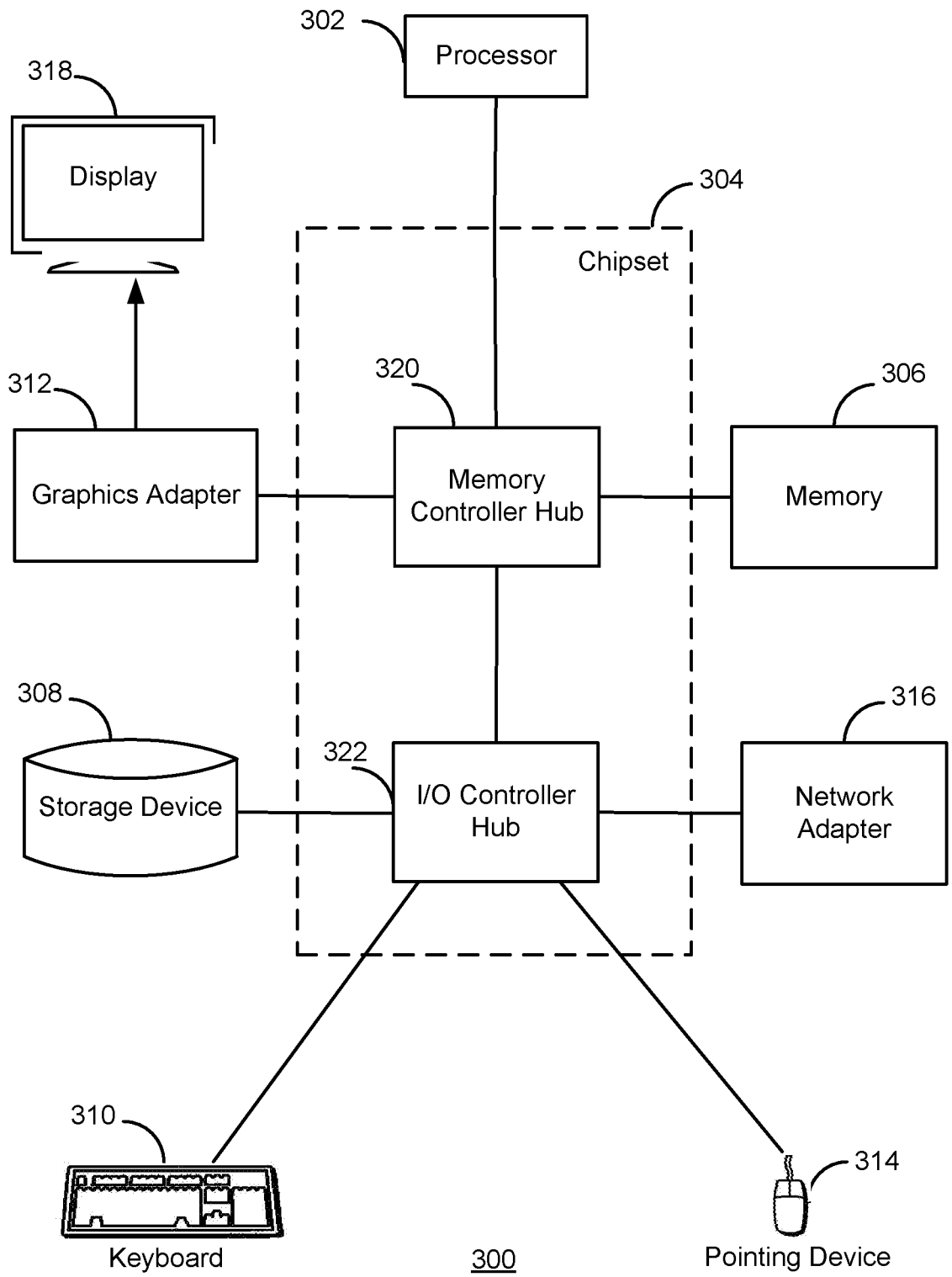
FIG. 3 is a high-level block diagram illustrating an example of a computer for use as one or more of the entities illustrated in FIG. 1, according to one embodiment.

FIG. 3 is a high-level block diagram illustrating an example of a computer 300 for use as one or more of the entities illustrated in FIG. 1, according to one embodiment. Illustrated are at least one processor 302 coupled to a chipset 304. The chipset 304 includes a memory controller hub 320 and an input/output (I/O) controller hub 322. A memory 306 and a graphics adapter 312 are coupled to the memory controller hub 320, and a display device 318 is coupled to the graphics adapter 312. A storage device 308, keyboard 310, pointing device 314, and network adapter 316 are coupled to the I/O controller hub 322. Other embodiments of the computer 300 have different architectures. For example, the memory 306 is directly coupled to the processor 302 in some embodiments.

The storage device 308 includes one or more non-transitory computer-readable storage media such as a hard drive, compact disk read-only memory (CD-ROM), DVD, or a solid-state memory device. The memory 306 holds instructions and data used by the processor 302. The pointing device 314 is used in combination with the keyboard 310 to input data into the computer system 300. The graphics adapter 312 displays images and other information on the display device 318. In some embodiments, the display device 318 includes a touch screen capability for receiving user input and selections. The network adapter 316 couples the computer system 300 to the network 110. Some embodiments of the computer 300 have different and/or other components than those shown in FIG. 3. For example, the identity management system 120 and the third-party service system 140 can be formed of multiple blade servers and lack a display device, keyboard, and other components.

The computer 300 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 308, loaded into the memory 306, and executed by the processor 302.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A method of providing secured identity management services, comprising:
    receiving, from a user, a request to visit a webpage of a destination website, the webpage having an input form with credential fields soliciting user credential information and malicious scripting code that monitors characters as they are input into the credential fields;
    determining whether the destination website is authentic by comparing a web address associated with the destination website to a list of known authentic web addresses; and
    responsive to determining that the destination website is not in the list of known authentic web addresses:
        overlaying the credential fields with a substitute form, the substitute form configured to replace the input form in receiving and storing user credential information entered by the user, the substitute form including hidden input fields that mirror the credential fields but are not monitored by the malicious scripting code, wherein the substitute form is a transparent iframe,
        in response to a user attempting to submit the input form, confirming with the user on provision of the user credential information stored in the substitute form to the destination website, and
        responsive to receiving a confirmation from the user to submit the credential information, modifying submission of the credential information by inserting the information from the substitute form to the input field for submission and causing the user credential information to be submitted to the destination website.

2. The method of claim 1, wherein determining whether the website is authentic comprises:
    comparing a web address associated with the website to a first list of known web addresses and a second list of known web addresses;
    wherein determining that the web address belongs to the first list of known web addresses and does not belong to the second list of known web addresses indicates that the website is authentic; and
    wherein determining that the web address belongs to the second list of known web addresses and does not belong to the first list of known web addresses indicates that the website is unauthentic.

3. The method of claim 1, wherein determining whether the website is authentic comprises:
    comparing a web address associated with the website to a list of known web addresses; and
    in response to determining that the web address is similar to one of the list of known web addresses, determining that the website is unauthentic.

4. The method of claim 1, further comprising:
    in response to determining that the website is authentic, submitting the credential information to the website.

5. The method of claim 1, wherein determining whether the destination website is authentic comprises:
    comparing a web address associated with the destination website to a first list of known web addresses and a second list of known web addresses;
    wherein determining that the web address belongs to the first list of known web addresses and does not belong to the second list of known web addresses indicates that the website is authentic; and
    wherein failing to determine that the web address belongs to the second list of known web addresses and does not belong to the first list of known web addresses indicates that the website is unauthentic.

6. The method of claim 1, wherein determining whether the destination website is authentic comprises:
    comparing a web address associated with the website to a list of known web addresses;

wherein determining that the web address belongs to a list of known web addresses indicates that the website is authentic; and wherein determining that the web address is similar to one of the list of known web addresses indicates that the website is unauthentic.

7. The method of claim 5, wherein determining whether the destination website is authentic comprises:

monitoring the credential information concurrently while the credential information is being entered by the user; and identifying a first list of known domain names associated with the credential information based on the credential information entered by the user, wherein the first list of known domain names is one of the first list of known web addresses and the second list of known web addresses.

8. The method of claim 1, further comprising:

maintaining a list of known unauthentic websites; and in response to determining that the website is unauthentic and not included in the list of known unauthentic websites, adding the website to the list of known unauthentic websites.

9. A computer system for providing secured identity management services, the system comprising:

a non-transitory computer-readable storage medium storing computer program modules executable to perform steps comprising:

receiving, from a user, a request to visit a webpage of a destination website, the webpage having an input form with credential fields soliciting user credential information and malicious scripting code that monitors characters as they are input into the credential fields;

determining whether the destination website is authentic by comparing a web address associated with the destination website to a list of known authentic web addresses; and responsive to determining that the destination website is not in the list of known authentic web addresses:

overlaying the credential fields with a substitute form, the substitute form configured to replace the input form in receiving and storing user credential information entered by the user, the substitute form including hidden input fields that mirror the credential fields but are not monitored by the malicious scripting code, wherein the substitute form is a transparent iframe, in response to a user attempting to submit the input form, confirming with the user on provision of the user credential information stored in the substitute form to the destination website, and responsive to receiving a confirmation from the user to submit the credential information, modifying submission of the credential information by inserting the information from the substitute form to the input field for submission and causing the user credential information to be submitted to the destination website; and a computer processor for executing the computer program modules.

10. The computer system of claim 9, wherein determining whether the website is authentic comprises:

comparing a web address associated with the website to a first list of known web addresses and a second list of known web addresses;

wherein determining that the web address belongs to the first list of known web addresses and does not belong to the second list of known web addresses indicates that the website is authentic; and wherein determining that the web address belongs to the second list of known web addresses and does not belong to the first list of known web addresses indicates that the website is unauthentic.

11. The computer system of claim 9, wherein determining whether the website is authentic comprises:

comparing a web address associated with the website to a list of known web addresses; and in response to determining that the web address is similar to one of the list of known web addresses, determining that the website is unauthentic.

12. The computer system of claim 9, wherein the non-transitory computer-readable storage medium store computer program modules executable to further perform steps comprising:

in response to determining that the website is authentic, submitting the credential information to the website.

13. The computer system of claim 9, wherein determining whether the destination website is authentic comprises:

comparing a web address associated with the destination website to a first list of known web addresses and a second list of known web addresses;

wherein determining that the web address belongs to the first list of known web addresses and does not belong to the first list of known web addresses indicates that the website is authentic; and wherein failing to determine that the web address belongs to the second list of known web addresses and does not belong to the second list of known web addresses indicates that the website is unauthentic.

14. The computer system of claim 12, wherein determining whether the destination website is authentic comprises:

comparing a web address associated with the website to a list of known web addresses;

wherein determining that the web address belongs to the list of known web addresses indicates that the website is authentic; and wherein determining that the web address is similar to one of the list of known web addresses indicates that the website is unauthentic.

15. The computer system of claim 13, wherein determining whether the destination website is authentic comprises:

monitoring the credential information concurrently while the credential information is being entered by the user; and identifying a first list of known domain names associated with the credential information based on the credential information entered by the user, wherein the first list of known domain names is one of the first list of known web addresses and the second list of known web addresses.

16. The computer system of claim 9, wherein the non-transitory computer-readable storage medium stores computer program modules executable to further perform steps comprising:

maintaining a list of known unauthentic websites; and in response to determining that the website is unauthentic and not included in the list of known unauthentic websites, adding the website to the list of known unauthentic websites.

17. A non-transitory computer-readable medium storing computer program instructions executable by a processor to perform operations, the operations comprising:
- receiving, from a user, a request to visit a webpage of a destination website, the webpage having an input form with credential fields soliciting user credential information and malicious scripting code that monitors characters as they are input into the credential fields;
- determining whether the destination website is authentic by comparing a web address associated with the destination website to a list of known authentic web addresses; and
- responsive to determining that the destination website is not in the list of known authentic web addresses:
    - overlaying the credential fields with a substitute form, the substitute form configured to replace the input form in receiving and storing user credential information entered by the user, the substitute form including hidden input fields that mirror the credential fields but are not monitored by the malicious scripting code, wherein the substitute form is a transparent iframe,
    - in response to a user attempting to submit the input form, confirming with the user on provision of the user credential information stored in the substitute form to the destination website, and
    - responsive to receiving a confirmation from the user to submit the credential information, modifying submission of the credential information by inserting the information from the substitute form to the input field for submission and causing the user credential information to be submitted to the destination website.

* * * * *